(12) United States Patent
Morini et al.

(10) Patent No.: US 6,716,939 B2
(45) Date of Patent: Apr. 6, 2004

(54) COMPONENTS AND CATALYSTS FOR THE POLYMERIZATION OF OLEFINS

(75) Inventors: Giampiero Morini, Padova (IT); Giulio Balbontin, Ferrara (IT); Peter A. A. Klusener, Utrecht (NL)

(73) Assignee: Basell Poliolefine Italia S.p.A., Milan (IT)

( * ) Notice: Subject to any disclaimer, the term of this patent is extended or adjusted under 35 U.S.C. 154(b) by 226 days.

(21) Appl. No.: 09/937,884

(22) PCT Filed: Jan. 25, 2001

(86) PCT No.: PCT/EO01/00828

§ 371 (c)(1),
(2), (4) Date: Oct. 1, 2001

(87) PCT Pub. No.: WO01/57099

PCT Pub. Date: Aug. 9, 2001

(65) Prior Publication Data

US 2002/0183575 A1 Dec. 5, 2002

(30) Foreign Application Priority Data

Feb. 2, 2000 (EP) .............................................. 00200342

(51) Int. Cl.$^7$ .................................................. C08F 4/44
(52) U.S. Cl. ................. 526/124.3; 526/142; 526/123.1; 526/124.1; 526/348; 502/103; 502/127; 502/115
(58) Field of Search .............................. 526/142, 124.3, 526/123.1, 124.1, 348; 502/103, 127, 115

(56) References Cited

U.S. PATENT DOCUMENTS

| | | | |
|---|---|---|---|
| 4,220,554 A | 9/1980 | Scatá et al. | 252/429 B |
| 4,298,718 A | 11/1981 | Mayr et al. | 526/125 |
| 4,399,054 A | 8/1983 | Ferraris et al. | 252/429 B |
| 4,469,648 A | 9/1984 | Ferraris et al. | 264/9 |
| 4,495,338 A | 1/1985 | Mayr et al. | 526/125 |
| 4,522,930 A | 6/1985 | Albizzati et al. | 502/124 |

FOREIGN PATENT DOCUMENTS

| | | | |
|---|---|---|---|
| EP | 0086473 | 8/1983 | C08F/10/00 |
| EP | 0125911 | 11/1984 | C08F/10/00 |
| EP | 0263718 | 4/1988 | C08F/210/16 |
| EP | 0267794 | 5/1988 | C08F/10/00 |
| EP | 0395083 | 10/1990 | C08F/4/02 |
| EP | 0553805 | 8/1993 | C08F/10/00 |
| EP | 0553806 | 8/1993 | C08F/10/00 |
| EP | 0601525 | 6/1994 | C08F/4/654 |
| JP | 58-138709 | * 8/1983 | |
| JP | 58138709 | 8/1983 | |
| JP | 2173105 | 7/1990 | |
| WO | 9844009 | 10/1998 | C08F/4/02 |
| WO | 0063261 | 10/2000 | C08F/10/00 |
| WO | WO 00/63261 | * 10/2000 | |

OTHER PUBLICATIONS

N. Long et al., Synthetic Communications, 11(9): 687–696 (1981).
W. Kofron et al., J. Org. Chem., 37(4): 555–559 (1972).
Vogel's Textbook of Practical Organic Chemistry, 5$^{th}$ Edition, p. 695–707 (1989).
J. Belletire et al., Tetrahedron Letters, 25(52): 5969–5972 (1984).
N. Petragnani et al., Synthesis, p. 710–713 (1980).
T. Ibuka et al., Journal of Organometallic Chemistry, 287: C18–C22 (1985).
E. Nielsen et al., Acta Chemical Scandinavica, 13: 1943–1954 (1959).
V. Andersen et al., Acta Chemical Scandinavica, 16: 947–952 (1962).
J. Petersen et al., Acta Chemical Scandinavica, 15: 271–276 (1961).

* cited by examiner

Primary Examiner—Ling-Siu Choi

(57) ABSTRACT

The present invention relates to a solid catalyst component for the polymerization of olefins $CH_2=CHR$ in which R is hydrogen or a hydrocarbon radical with 1–12 carbon atoms, comprising Mg, Ti, halogen and an electron donor selected from substituted succinates of a particular formula. Said catalyst components when used in the polymerization of olefins, and in particular of propylene, are capable to give polymers in high yields and with high isotactic index expressed in terms of high xylene insolubility.

21 Claims, No Drawings

COMPONENTS AND CATALYSTS FOR THE POLYMERIZATION OF OLEFINS

This application is the U.S. national phase of International Application PCT/EP01/00828, filed Jan. 25, 2001.

The present invention relates to catalyst components for the polymerization of olefins, to the catalysts obtained therefrom and to the use of said catalysts in the polymerization of olefins $CH_2=CHR$ in which R is hydrogen or a hydrocarbyl radical with 1–12 carbon atoms. In particular the present invention relates to catalyst components, suitable for the stereospecific polymerization of olefins, comprising Ti, Mg, halogen and an electron donor compound selected from esters of substituted succinic acids (substituted succinates). Said catalyst components when used in the polymerization of olefins, and in particular of propylene, are capable to give polymers in high yields and with high isotactic index expressed in terms of high xylene insolubility.

The chemical class of succinates is known in the art. However, the specific succinates of the present invention have never been used as internal electron donors in catalysts for the polymerization of olefins.

EP-A-86473 mentions the use of unsubstituted succinates as internal donors in catalyst components for the polymerization of olefins. The use of diisobutyl succinate and di-n-butyl succinate is also exemplified. The results obtained in terms of isotactic index and yields are however poor.

The use of polycarboxylic acid esters, including succinates, as internal donors in catalyst components for the polymerization of olefins, is also generically disclosed in EP 125911. Diethyl methylsuccinate and diallyl ethylsuccinate are mentioned in the description although they are not exemplified. Furthermore, E1P263718 mentions, but does not exemplify, the use of diethyl methylsuccinate and di-n-butyl ethylsuccinate as internal donors. In order to check the performances of these succinates according to the teaching of the art the applicant has carried out some polymerization tests employing catalyst components containing diethyl methylsuccinate and diethyl ethylsuccinate, respectively, as internal donors. As shown in the experimental section, the so obtained catalysts gave an unsatisfactory activity/stereospecificity balance very similar to that obtained with catalysts containing unsubstituted succinates.

It has been therefore very surprising to discover that the specific substitution in the succinates of the invention generates compounds that, when used as internal donors, give catalyst components having improved activity and stereo specificity. It is therefore an object of the present invention to provide a solid catalyst component for the polymerization of olefins $CH_2=CHR$ in which R is hydrogen or a hydrocarbon radical with 1–12 carbon atoms, comprising Mg, Ti, halogen and an electron donor selected from succinates of formula (I):

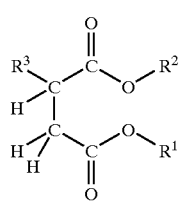

(I)

wherein the radicals $R^1$ and $R^2$, equal to or different from each other, are a $C_1$–$C_{20}$ linear or branched alkyl, alkenyl, cycloalkyl, aryl, arylalkyl or alkylaryl group, optionally containing heteroatoms and the radical $R^3$ is a linear alkyl group having at least four carbon atoms optionally containing heteroatoms.

$R^1$ and $R^2$ are preferably $C_1$–$C_8$ alkyl, cycloalkyl, aryl, arylalkyl and alkylaryl groups. Particularly preferred are the compounds in which $R^1$ and $R^2$ are selected from primary alkyls and in particular branched primary alkyls. Examples of suitable $R^1$ and $R^2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ is a linear alkyl having from 4 to 20 carbon atoms. Particularly preferred are the compounds in which $R_3$ is a linear alkyl group having from 4 to 15 carbon atoms.

Specific examples of suitable monosubstituted succinate compounds are dimethyl n-butylsuccinate, dimethyl n-pentylsuccinate, dimethyl n-hexylsuccinate, dimethyl n-heptylsuccinate, dimethyl n-octylsuccinate, dimethyl n-nonylsuccinate, dimethyl n-decylsuccinate, dimethyl n-undecylsuccinate, dimethyl n-dodecylsuccinate, dimethyl tetradecylsuccinate, diethyl n-butylsuccinate, diethyl n-pentylsuccinate, diethyl n-hexylsuccinate, diethyl n-heptylsuccinate, diethyl n-octylsuccinate, diethyl n-nonylsuccinate, diethyl n-decylsuccinate, diethyl n-undecylsuccinate, diethyl n-dodecylsuccinate, diethyl tetradecylsuccinate, diisobutyl n-butylsuccinate, diisobutyl n-pentylsuccinate, diisobutyl n-hexylsuccinate, diisobutyl n-heptylsuccinate, diisobutyl n-octylsuccinate, diisobutyl n-nonylsuccinate, diisobutyl n-decylsuccinate, diisobutyl n-undecylsuccinate, diisobutyl n-dodecylsuccinate, diisobutyl tetradecylsuccinate, dineopentyl n-butylsuccinate, dineopentyl n-pentylsuccinate, dineopentyl n-hexylsuccinate, dineopentyl n-heptylsuccinate, dineopentyl n-octylsuccinate, dineopentyl n-nonylsuccinate, dineopentyl n-decylsuccinate, dineopentyl n-undecylsuccinate, dineopentyl n-dodecylsuccinate, dineopentyl tetradecylsuccinate, di-n-butyl n-butylsuccinate, di-n-butyl n-pentylsuccinate, di-n-butyl n-hexylsuccinate, di-n-butyl n-heptylsuccinate, di-n-butyl n-octylsuccinate, di-n-butyl n-nonylsuccinate, di-n-butyl n-decylsuccinate, di-n-butyl n-undecylsuccinate, di-n-butyl n-dodecylsuccinate, di-n-butyl tetradecylsuccinate, methyl ethyl n-butylsuccinate, methyl ethyl n-pentylsuccinate, methyl ethyl n-hexylsuccinate, methyl ethyl n-heptylsuccinate, methyl ethyl n-octylsuccinate, methyl ethyl n-nonylsuccinate, methyl ethyl n-decylsuccinate, methyl ethyl n-undecylsuccinate, methyl ethyl n-dodecylsuccinate, methyl ethyl tetradecylsuccinate, isobutyl ethyl n-butylsuccinate, isobutyl ethyl n-pentylsuccinate, isobutyl ethyl n-hexylsuccinate, isobutyl ethyl n-heptylsuccinate, isobutyl ethyl n-octylsuccinate, isobutyl ethyl n-nonylsuccinate, isobutyl ethyl n-decylsuccinate, isobutyl ethyl n-undecylsuccinate, isobutyl ethyl n-dodecylsuccinate, isobutyl ethyl tetradecylsuccinate.

It is easily derivable for the ones skilled in the art that all the above mentioned compounds can be used either in form of pure isomers or in the form of mixtures of enantiomers, or mixture of regioisomers and enantiomers. When a pure isomer is to be used it is normally isolated using the common techniques known in the art.

As explained above, the catalyst components of the invention comprise, in addition to the above electron donors, Ti, Mg and halogen. In particular, the catalyst components comprise a titanium compound, having at least a Ti-halogen bond and the above mentioned electron donor compound supported on a Mg halide. According to the present invention with the term supported on a Mg halide are meant the Ti compound and the electron donor compounds which are not extractable to an extent higher than 50% when the extraction is carried out with heptane at 80° C. in 2 hours. The magnesium halide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line. The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium and y is a number between 1 and n, can be used.

The preparation of the solid catalyst component can be carried out according to several methods. According to one of these methods, the magnesium dichloride in an anhydrous state and the succinate of formula (I) are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the substituted succinate is treated with halogenated hydrocarbons such as 1,2-dichloroethane, chlorobenzene, dichloromethane etc. The treatment is carried out for a time between 1 and 4 hours and at a temperature ranging from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. which contains, in solution, a succinate of formula (I). The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of $TiCl_4$ comprising the succinate of formula (I) in solution at a temperature of about 80 to 120° C.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80–130° C.) so as to obtain an adduct in which the number of moles of alcohol is generally lower than 3 preferably between 0.1 and 2.5. The reaction with the Ti compound can be carried out by suspending the adduct (dealcoholated or as such) in cold $TiCl_4$ (generally 0° C.); the mixture is heated up to 80–130° C. and kept at this temperature for 0.5–2 hours. The treatment with $TiCl_4$ can be carried out one or more times. The succinate of formula (I) can be added during the treatment with $TiCl_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44009.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10,0000 Å generally ranges from 0.3 to 1.5 $cm^3/g$, preferably from 0.45 to 1 $cm^3/g$.

A further method to prepare the solid catalyst component of the invention comprises halogenating magnesium dihydrocarbyloxide compounds, such as magnesium dialkoxide or diaryloxide, with solution of $TiCl_4$ in aromatic hydrocarbon (such as toluene, xylene etc.) at temperatures between 80 and 130° C. The treatment with $TiCl_4$ in aromatic hydrocarbon solution can be repeated one or more times, and the substituted succinate is added during one or more of these treatments.

In any of these preparation methods the desired succinate of formula (I) can be added as such or, in an alternative way, it can be obtained in situ by using an appropriate precursor capable to be transformed in the desired electron donor compound by means, for example, of known chemical reactions such as esterification, transesterification, etc. Generally, the succinate of formula (I) is used in molar ratio with respect to the $MgCl_2$ ranging from 0.01 to 1 and preferably from 0.05 to 0.5.

The solid catalyst components according to the present invention are converted into catalysts for the polymerization of olefins by reacting them with organoaluminum compounds according to known methods.

In particular, it is an object of the present invention a catalyst for the polymerization of olefins $CH_2=CHR$, in which R is hydrogen or a hydrocarbyl radical with 1–12 carbon atoms, comprising the product of the reaction between:

(a) a solid catalyst component comprising a Mg, Ti and halogen and an electron donor selected from succinates of formula (I);
(b) an alkylaluminum compound and, optionally,
(c) one or more electron-donor compounds (external donor).

The alkyl-Al compound (b) is preferably selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum compounds with alkylaluminum halides, alkylaluminum hydrides or alkylaluminum sesquichlorides, such as $AlEt_2Cl$ and $Al_2Et_3Cl_3$.

The external donor (c) can be of the same type or it can be different from the succinate of formula (I). Suitable external electron-donor compounds include silicon compounds, ethers, esters such as phthalates, benzoates, succinates also having a different structure from those of formula (I), amines, heterocyclic compounds and particularly 2,2,6,6-tetramethylpiperidine, ketones and the 1,3-diethers of the general formula (H):

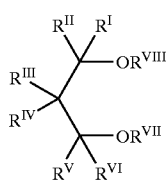

(II)

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle. Particularly preferred are the 1,3-diethers in which $R^{VII}$ and $R^{VIII}$ are selected from $C_1$–$C_4$ alkyl radicals.

Another class of preferred external donor compounds is that of silicon compounds of formula $R^5_a R^6_b Si(OR^7)_c$, where a and b are integers from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3–10 carbon atoms optionally containing heteroatoms and $R^7$ is a $C_1$–$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, (2-ethylpiperidinyl)t-butyldimethoxysilane, (2-ethylpiperidinyl) thexyldimethoxysilane, (3,3,3-trifluoro-n-propyl) (2-ethylpiperidinyl)dimethoxysilane, methyl(3,3,3-trifluoro-n-propyl)dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

The electron donor compound (c) is used in such an amount to give a molar ratio between the organoaluminum compound and said electron donor compound (c) ranging from 0.1 to 500, preferably from 1 to 300 and more preferably from 3 to 100. As previously indicated, when used in the (co)polymerization of olefins, and in particular of propylene, the catalysts of the invention allow to obtain, with high yields, polymers having a high isotactic index (expressed by high xylene insolubility X.I.), thus showing an excellent balance of properties. This is particularly surprising in view of the fact that, as it can be seen from the comparative examples here below reported, the use as internal electron donors of unsubstituted succinate compounds gives worse results in term of yields and/or xylene insolubility.

As mentioned above, the succinates of the present invention can also be useful as external donors in catalysts for the polymerization of olefins. Accordingly, another object of the present invention is a catalyst for the polymerization of olefins $CH_2$=CHR, in which R is hydrogen or a hydrocarbyl radical with 1–12 carbon atoms, comprising the product of the reaction between:

(i) a solid catalyst component comprising a Mg, Ti and halogen and optionally containing an electron donor compound;
(ii) an alkylaluminum compound and,
(iii) one or more electron-donor compounds (external donor) selected from succinates of formula (I).

The electron donor compound present on the catalyst component (i) can be selected from the same classes described for the electron donor (c). Preferably, it is selected from esters like phthalates and the 1,3 diethers of formula (II) disclosed above.

According to what has been mentioned above it constitutes a particular object of the present invention a process for the (co)polymerization of olefins $CH_2$=CHR, in which R is hydrogen or a hydrocarbyl radical with 1–12 carbon atoms, carried out in the presence of a catalyst comprising the product of the reaction between:

(a) a solid catalyst component comprising a Mg, Ti, halogen and an electron donor selected from succinates of formula (I);
(b) an alkylaluminum compound and, optionally,
(c) one or more electron-donor compounds (external donor).

Said polymerization process can be carried out according to known techniques for example slurry polymerization using as diluent an inert hydrocarbon solvent, or bulk polymerization using the liquid monomer (for example propylene) as a reaction medium. Moreover, it is possible carrying out the polymerization process in gas-phase operating in one or more fluidized or mechanically agitated bed reactors.

The polymerization is generally carried out at temperatures ranging from 20 to 120° C., preferably from 40 to 80° C. When the polymerization is carried out in gas-phase the operating pressure is generally between 0.5 and 10Ha, preferably between 1 and 5 MPa In the bulk polymerization the operating pressure is generally between 1 and 6 MPa preferably between 1.5 and 4 MPa. Hydrogen or other compounds capable to act as chain transfer agents can be used to control the molecular weight of the polymer.

The following examples are given in order to better illustrate the invention without limiting it.

CHARACTERIZATIONS

Preparation of Succinates

Succinates have been prepared according to known methods described in the literature, (for example by alkylation of dialkyl succinates: N. R. Long and M. W. Rathke, Synthetic Commun. 11, 687, 1981; W. G. Kofron and L. G. Wideman, *J. Org. Chem.* 37, 555, 1972; by esterification of alkylsuccinates: "*Vogel's textbook of practical organic chemistry*", 5th Edition (1989), pages 695–707; by coupling of acids or alkyl monoesters: J. L. Belletire, E. G. Spletzer and A. R. Pinhas, Tetrahedron Lett. 25, 5969, 1984; N. Petragnani, and M. Yonahiro, Synthesis, 710, 1980; by addition to dialkyl maleates of dialkyl fumarates: T. Ibuka, T. Aoyagi, K. Kitada, F. Yoneda and Y. Yamamoto, J. Organomet. Chem., 287, C18, 1985; E. B. Nielsen, J. Munch-Petersen, P. M. Jorgensen and S. Refn, Acta Chem. Scand., 13, 3, 1959; V. K. Andersen and J. Munch-Petersen, Acta Chem. Scand., 16, 947, 1962; J. Munch-Petersen and V. K. Andersen, Acta Chem. Scand., 15, 271, 1961).

Propylene Polymerization: General Procedure

In a 4 liter autoclave, purged with nitrogen flow at 70° C. for one hour, 75 mL of anhydrous hexane containing 800 mg of $AlEt_3$, 79.8 mg of dicyclopentyldimethoxysilane and 10 mg of solid catalyst component were introduced in propylene flow at 30° C. The autoclave was closed. 1.5 NL of hydrogen were added and then, under stirring, 1.2 Kg of liquid propylene were fed. The temperature was risen to 70° C. in five minutes and the polymerization was carried out at this temperature for two hours. The non-reacted propylene was removed, the polymer was collected, dried at 70° C. under vacuum for three hours, weighed, and fractionated with o-xylene to determine the amount of the xylene insoluble (X.I.) fraction at 25° C.

Determination of X.I.

2.5 g of polymer were dissolved in 250 mL of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference the xylene insoluble fraction (%).

EXAMPLES

Examples 1–3 and Comparative Examples 4–5
Preparation of Solid Catalyst Components.

Into a 500 mL four-necked round-bottomed flask, purged with nitrogen, 250 mL of $TiCl_4$ were introduced at 0° C. While stirring, 10.0 g of microspheroidal $MgCl_2*2.8C_2H_5OH$ (prepared according to the method described in ex.2 of U.S. Pat. No. 4,399,054 but operating at 3,000 rpm instead of 10,000 rpm) and 7.4 mMoles of succinate were added. The temperature was raised to 100° C. and maintained for 120 min. Then, the stirring was discontinued, the solid product was allowed to settle and the supernatant liquid was siphoned off.

250 mL of fresh $TiCl_4$ were added. The mixture was reacted at 120° C. for 60 min and, then, the supernatant liquid was siphoned off. The solid was washed six times with anhydrous hexane (6×100 mL) at 60° C. Finally, the solid was dried under vacuum and analyzed. The type and amount of succinate (wt %) and the amount of Ti (wt %) contained in the solid catalyst component are reported in Table 1. Polymerization results are reported in Table 2.

TABLE 1

| Ex. | Succinate | Wt % | Ti Wt % |
|---|---|---|---|
| 1 | Diethyl n-butylsuccinate | 7.1 | 3.0 |
| 2 | Diethyl n-hexylsuccinate | 11.2 | 3.3 |
| 3 | Diethyl n-decylsuccinate | 17.1 | 3.4 |
| Comp. 4 | Diethyl methylsuccinate | 10.9 | 3.4 |
| Comp. 5 | Diethyl ethylsuccinate | 10.1 | 2.7 |

TABLE 2

| Example n. | Yield KgPP/gCat | X.I. Wt % |
|---|---|---|
| 1 | 22 | 97.5 |
| 2 | 21 | 97.2 |
| 3 | 30 | 97.0 |
| Comp. 4 | 11 | 95.8 |
| Comp. 5 | 14 | 96.5 |

What is claimed is:

1. A solid catalyst component for the polymerization of olefins $CH_2$=CHR, in which R is hydrogen or a hydrocarbyl radical with 1–12 carbon atoms, comprising Mg, Ti, halogen and an electron donor selected from succinates of formula (I):

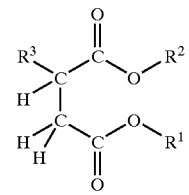

wherein the radicals $R^1$ and $R^2$, equal to or different from each other, are $C_1$–$C_{20}$ linear or branched alkyl, alkenyl, cycloalkyl, aryl, arylalkyl or alkylaryl groups, optionally containing heteroatoms and the radical $R^3$ is a linear alkyl group having at least four carbon atoms optionally containing heteroatoms.

2. The solid catalyst component according to claim 1 in which the electron donor compound of formula (I) is selected from those in which $R^1$ and $R^2$ are $C_1$–$C_8$ alkyl, cycloalkyl, aryl, arylalkyl or alkylaryl groups.

3. The solid catalyst component according to claim 2 in which $R^1$ and $R^2$ are primary alkyls.

4. The solid catalyst component according to claim 3 in which $R^1$ and $R^2$ are ethyl, isobutyl or neopentyl.

5. The solid catalyst component according to claim 1 in which $R^3$ is a linear alkyl having from 4 to 20 carbon atoms.

6. The solid catalyst component according to claim 5 in which $R^3$ is a linear alkyl group having from 4 to 15 carbon atoms.

7. The solid catalyst component according to claim 1 in which the succinates are selected from diethyl n-butylsuccinate, diethyl n-pentylsuccinate, diethyl n-hexylsuccinate, diethyl n-heptylsuccinate, diethyl n-octylsuccinate, diethyl n-nonylsuccinate, diethyl n-decylsuccinate, diethyl n-undecylsuccinate, diethyl n-dodecylsuccinate, diethyl tetradecylsuccinate, diisobutyl n-butylsuccinate, diisobutyl n-pentylsuccinate, diisobutyl n-hexylsuccinate, diisobutyl n-heptylsuccinate, diisobutyl n-octylsuccinate, diisobutyl n-nonylsuccinate, diisobutyl n-decylsuccinate, diisobutyl n-undecylsuccinate, diisobutyl n-dodecylsuccinate, diisobutyl tetradecylsuccinate, dineopentyl n-butylsuccinate, dineopentyl n-pentylsuccinate, dineopentyl n-hexylsuccinate, dineopentyl n-heptylsuccinate, dineopentyl n-octylsuccinate, dineopentyl n-nonylsuccinate, dineopentyl n-decylsuccinate, dineopentyl n-undecylsuccinate, dineopentyl n-dodecylsuccinate, or dineopentyl tetradecylsuccinate.

8. The solid catalyst component according to claim 1 comprising a titanium compound having at least a Ti-halogen bond and the succinate of formula (I) supported on a Mg halide in active form.

9. The solid catalyst component according to claim 8 in which the titanium compound is $TiCl_4$ or $TiCl_3$.

10. A catalyst for the polymerization of olefins $CH_2$=CHR, in which R is hydrogen or a hydrocarbyl radical with 1–12 carbon atoms, comprising the product of the reaction between:

(a) a solid catalyst component comprising Mg, Ti, halogen and an electron donor selected from succinates of formula (I):

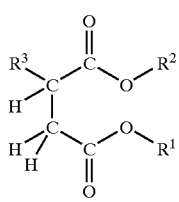

(I)

wherein the radicals $R^1$ and $R^2$, equal to or different from each other, are $C_1$–$C_{20}$ linear or branched alkyl, alkenyl, cycloalkyl, aryl, arylalkyl or alkylaryl groups, optionally containing heteroatoms and the radical $R^3$ is a linear alkyl group having at least four carbon atoms optionally containing heteroatoms;

(b) an alkylaluminum compound and, optionally, (c) one or more external electron-donor compounds.

11. The catalyst according to claim 10 in which the alkylaluminum compound (b) is a trialkyl aluminum compound.

12. The catalyst according to claim 11 in which the trialkyl aluminum compound is triethylaluminum, triisobutylaluminum, tri-n-butylaluminum, tri-n-hexylaluminum, or tri-n-octylaluminum.

13. The catalyst according to claim 10 in which the external donor (c) is a silicon compound of formula $R^5_a R^6_b Si(OR^7)_c$, where a and b are integers from 0 to 2, c is an integer from 1 to 4 and the sum (a+b+c) is 4; $R^5$, $R^6$ and $R^7$ are alkyl, cycloalkyl or aryl radicals with 1–18 carbon atoms optionally containing heteroatoms.

14. The catalyst according to claim 13 in which a is 1, b is 1 and c is 2.

15. The catalyst according to claim 13 in which at least one of $R^5$ and $R^6$ are branched alkyl, cycloalkyl or aryl groups with 3–10 carbon atoms optionally containing heteroatoms and $R^7$ is a $C_1$–$C_{10}$ alkyl group.

16. The catalyst according to claim 13 in which a is 0, c is 3 and $R^6$ is a branched alkyl or cycloalkyl group and $R^7$ is methyl.

17. The catalyst according to claim 13 in which the silicon compound is methylcyclohexyldimethoxysilane, diphenyldimethoxysilane, methyl-t-butyldimethoxysilane, dicyclopentyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, or methyl(3,3,3-trifluoro-n-propyl)dimethoxysilane.

18. A process for the (co)polymerization of olefins $CH_2=CHR$, in which R is hydrogen or a hydrocarbyl radical with 1–12 carbon atoms, carried out in the presence of a catalyst comprising the product of the reaction between:

(a) a solid catalyst component comprising Mg, Ti, halogen and an electron donor selected from succinates of formula (I):

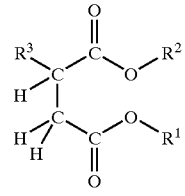

(I)

wherein the radicals $R^1$ and $R^2$, equal to or different from each other, are $C_1$–$C_{20}$ linear or branched alkyl, alkenyl, cycloalkyl, aryl, arylalkyl or alkylaryl groups, optionally containing heteroatoms and the radical $R^3$ is a linear alkyl group having at least four carbon atoms optionally containing heteroatoms;

(b) an alkylaluminum compound and, optionally, (c) one or more external electron-donor compounds.

19. A catalyst for the polymerization of olefins $CH_2=CHR$, in which R is hydrogen or a hydrocarbyl radical with 1–12 carbon atoms, comprising the product of the reaction between:

(a) a solid catalyst component comprising a Mg, Ti and halogen and optionally containing an electron donor compound;

(b) an alkylaluminum compound; and (c) at least one external electron-donor compound selected from succinates of formula (I)

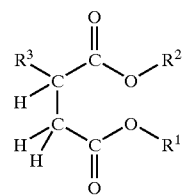

(I)

wherein the radicals $R^1$ and $R^2$, equal to or different from each other, are $C_1$–$C_{20}$ linear or branched alkyl, alkenyl, cycloalkyl, aryl, arylalkyl or alkylaryl groups, optionally containing heteroatoms and the radical $R^3$ is a linear alkyl group having at least four carbon atoms optionally containing heteroatoms.

20. The catalyst according to claim 15 wherein $R^7$ is methyl.

21. A process comprising using succinates of formula (I) as electron donors in a catalyst for the polymerization of olefins

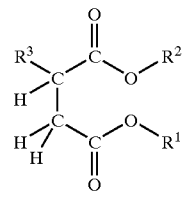

(I)

wherein the radicals $R^1$ and $R^2$, equal to or different from each other, are $C_1$–$C_{20}$ linear or branched alkyl, alkenyl, cycloalkyl, aryl, arylalkyl or alkylaryl groups, optionally containing heteroatoms and the radical $R^3$ is a linear alkyl group having at least four carbon atoms optionally containing heteroatoms.

* * * * *